United States Patent [19]

Bugg et al.

[11] Patent Number: 4,882,003

[45] Date of Patent: Nov. 21, 1989

[54] SEALANT PRIMER COMPOSITION AND METHOD

[75] Inventors: Brian J. Bugg, Wixom; Glenn E. Martin, Farmington Hills; David J. Oberg, Birmingham; Adriana E. Ticu, Detroit, all of Mich.

[73] Assignee: BASF Corporation, Clifton, N.J.

[21] Appl. No.: 221,075

[22] Filed: Jul. 19, 1988

[51] Int. Cl.$^4$ .................................................. C09J 5/04
[52] U.S. Cl. ..................................... 156/315; 156/108; 524/365; 524/379; 524/556; 526/287
[58] Field of Search ............... 524/365, 556, 379; 526/287; 156/108, 315

[56] References Cited

U.S. PATENT DOCUMENTS

| | | |
|---|---|---|
| 3,033,833 | 5/1962 | LeFevre . |
| 3,155,204 | 11/1964 | Campbell et al. ............... 156/108 |
| 3,707,521 | 12/1972 | DeSantis . |
| 3,711,449 | 1/1973 | Brendley ............... 526/287 |
| 3,779,794 | 12/1973 | DeSantis . |
| 3,872,047 | 3/1975 | Jandourek . |
| 3,981,113 | 9/1976 | Griffin ............... 52/208 |
| 4,222,925 | 9/1980 | Bryant et al. . |
| 4,436,875 | 3/1984 | Janiga . |
| 4,687,533 | 8/1987 | Rizk et al. . |

*Primary Examiner*—John J. Gallagher
*Attorney, Agent, or Firm*—Jerry F. Janssen

[57] ABSTRACT

A sealant primer composition useful for promoting the adherence of non-porous materials to enamel paint coated substrates comprises (1) an acrylic polymer base composition comprising the reaction product of 2-sulfoethyl methacrylate and lower alkyl esters of methacrylic acid, (2) a pigmenting agent, and (3) a solvent effective to interpenetrate the enamel substrate coating.

9 Claims, No Drawings

SEALANT PRIMER COMPOSITION AND METHOD

FIELD OF THE INVENTION

This invention relates to polymeric sealant compositions and to a method of bonding non-porous materials to substrates. More particularly, this invention is concerned with a sealant primer composition particularly adapted for promoting the bonding of fixed window glass panels to precoated motor vehicle bodies.

BACKGROUND OF THE INVENTION

In the manufacture of motor vehicles, it is the practice to attach fixed glass panels (i.e windshields, taillights, rear window panels, and certain side window panels on automobile, truck and bus bodies) to the vehicle body by means of a thick bead of elastomeric sealant material. The sealant materials which are used for this purpose are required to meet a number of criteria including appearance, ease of application, shear strength, and adhesion in crash tests. The window sealant compositions are often applied directly over the paint coating finishes on the motor vehicle body. This means that good adhesion both between the sealant composition and the paint coating and between the sealant composition and the glass panel is required. Sometimes, a weaker than desired bond is formed between the sealant bead and the paint coating and the sealant bead delaminates from the underlying paint layer. This can lead to isolated leaks between the window panel and the motor vehicle body or, at worst, total failure of the bond between the motor vehicle body and the fixed window panel.

To promote adhesion between the sealant composition and a substrate and non-porous materials such as glass, ceramic, or composite materials, a number of sealant primer compositions have been disclosed in the prior art in areas relating to motor vehicle manufacture as well as other areas.

For example, United States Patent 3,707,521 to De Santis, and its divisional, U.S. Pat. No. 3,779,794, disclose a polyurethane sealant primer composition comprising a branched polyurethane polymer in combination with a latent catalyst for the moisture curing of free isocyanate groups present.

U.S. Pat. No. 3,872,047 to Jandourek discloses a sealant primer composition comprising a polymer having high polar hydrophilic groups and low polar hydrophobic groups for bonding dental restorative materials to metalion containing substrates.

U.S. Pat. No. 3,033,833 to Le Fevre, et al. discloses interpolymers of l-sulfoalkyl esters of alkylacrylic acids and other polymerizable ethylenically unsaturated compounds having utility, for example, in preparing surfaces to better receive dyes.

SUMMARY OF THE INVENTION

The present invention provides a sealant primer composition particularly adapted for use in bonding nonporous materials to enamel paint coated substrates. The sealant primer composition comprises from about 35 weight percent to about 55 weight percent of a sealant primer polymer base composition which comprises an addition polymer reaction product of monomers selected from the group consisting of

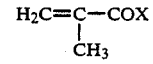

wherein X is alkoxyl of from one to four carbon atoms, and $-OCH_2CH_2SO_3H$ or $-NHC(CH_3)_2CH_2SO_3H$; from about 1 weight percent to about 10 weight percent of a pigment dispersion; with the balance comprising a solvent effective to interpenetrate the substrate enamel coating selected from the group consisting of chlorinated saturated hydrocarbons of from two to three carbon atoms, saturated alkanols of from one to six carbon atoms, saturated dialkyl ketones of from three to ten carbon atoms, and alkylated benzene hydrocarbons of from seven to ten carbon atoms.

DETAILED DESCRIPTION OF THE INVENTION

The sealant primer compositions of the present invention are particularly adapted for use in promoting the adherence of non-porous materials to enamel-coated substrates. They are especially useful in bonding glass panels to enamel-coated metal substrate surfaces in the manufacture of motor vehicles The composition comprises an acrylic polymer base composition, a pigmenting agent, and a solvent vehicle The composition may also contain small amounts of other ingredients known in the art such as fumed silica, plasticizers, surfactants, and the like to obtain the desired consistency of the final composition.

The acrylic base polymer composition is a copolymer reaction product of alkyl esters of methacrylic acid and 2-sulfoethyl methacrylate (i.e. 2-methylpropenoic acid, 2-hydroxyethanesulfonic acid ester) $CH_2=C(CH_3)CONH(CH_3)_2SO_3H$ having a weight average molecular weight in the range of between about 20,000 and 100,000 Daltons The alkyl ester monomers of methacrylic acid are selected from methyl methacrylate, ethyl methacrylate, propyl and iso-propyl methacrylate, n-butyl, sec-butyl, iso-butyl, and tert-butyl methacrylate, with the methyl, butyl, and iso-butyl esters being preferred.

The acrylic base polymer is synthesized by conventional methods known in the art using either of two alternative methods. In one method, a suitable, non-reactive solvent such as toluene, 1,1,1-trichloroethane, an aliphatic hydrocarbon such as hexane or heptane, or a ketone solvent such as methyl ethyl ketone, is heated to reflux and the mixture of monomer compounds is added. An addition polymerization initiator such as 2,2'-azobis(2-methylbutyronitrile) is then added and the reaction is allowed to proceed, with small amounts of polymerization initiator added during the course of the reaction as needed. At the end of the reaction, the viscous solution of acrylic polymer is poured from the reaction vessel and diluted further with the desired solvents and additional components such as fumed silica and pigmenting agents added to make up the final sealant composition.

In an alternative method of preparing the polymer base composition, a solution of the monomer compounds in the desired non-reactive solvent is heated to reflux and the addition polymerization initiator added. During the course of the eaction, additional monomer and initiator are added as needed or desired.

The pigmenting agent in the sealant primer compositions of the present invention is preferably carbon black of a particle size less than 15 microns. The carbon black is present in the sealant primer composition in the range of from about 1 weight percent to about 10 weight percent of the total sealant primer composition, preferably in an amount of between about 2 to 5 weight percent.

The solvent system which is employed in the sealant primer compositions of the present invention performs an important role in the functioning of the sealant primer. The solvent performs its usual function of providing a vehicle for the solids content of the sealant primers, providing sufficient fluidity to the compositions so that they may be applied to the substrate. However, a more critical function of the solvent is performed by its ability to interpenetrate the underlying enamel paint coating layer on the substrate to permit efficient bonding of the polar functional groups present in the sealant primer polymer to the enamel coating. In serving this function, the solvent must possess the correct combination of solvent strength, volatility, permeability and wettability. The solvent must have sufficient solvent strength to soften and interpenetrate the substrate coating, while not completely dissolving or loosening the enamel coating from the substrate surface. The requirements of solvent strength depend, in part, upon the composition and hardness of the substrate enamel coating. When the enamel coating on the substrate has been thoroughly cured, either by high curing temperatures or long curing times, or both, the solvent must have a high solvent strength in order to soften and interpenetrate the substrate enamel coating. On the other hand, when the substrate enamel coating is relatively soft, due either to low curing temperatures or short curing times, or both, the solvent system should possess low solvent strength. By the term "solvent strength" is meant the solubility strength of the particular solvent system and is measured by the "solubility parameter" of the solvent. (See H. Burrell, "Solubility Parameters for Film Formers," Official Digest of the Federation of Paint and Varnish Production Clubs, October 1957, the contents of which are incorporated herein by reference.)

In addition, the solvent should possess high evaporation rate so that the sealant primer composition dries quickly after being applied and the solvent begins to leave the applied layer of sealant primer and the underlying layer of enamel coating before penetrating entirely through the coating layer.

High permeability rate of the solvent in and out of the substrate enamel coating layer(s) and through the overlying layer of sealant primer polymer after application is also an important property of the solvent.

Finally, the ability of the solvent to wet the substrate enamel coating is important to insure maximum adherence of the sealant composition when it is applied, for example by brushing. Wettability is measured by the drop contact angle method well known in the art.

Solvents which meet the above criteria are selected from alkylated benzene hydrocarbon solvents such as toluene, the xylenes, ethylbenzene, and the like, chlorinated saturated hydrocarbon solvents such as 1,1,1-trichloroethane, 1,1,2-trichloroethane, and the like, dialkyl ketone solvents such as acetone, methyl ethyl ketone, diethyl ketone, and the like, and saturated alkanols such as methanol, ethanol, propanol, iso-propanol, n-butanol, iso-butanol, tert-butanol and the like, as well as mixtures of the foregoing.

In those applications where the sealant primer is to be applied to a "hard" enamel-coated substrate, i.e. where the enamel paint coating on the substrate has been thoroughly cured, a "strong" solvent system for the sealant primer is selected. A strong solvent system is one comprised primarily of solvents which have both a high solubility parameter value and a moderate or strong tendency to hydrogen bond such as the ketone and alcohol solvents. One such preferred strong solvent system is a combination of from about 75 weight percent to about 90 weight percent methyl ethyl ketone with the balance comprising iso-propanol, based on the weight of the solvent.

When the sealant primer is to be applied to a "soft" enamel paint coating on a substrate, a "weak" solvent system for the sealant primer is selected. A weak solvent system is one comprised primarily of hydrocarbon solvents which have low solubility parameters and a moderate to weak tendency to hydrogen bond. The so-called weak solvent systems may also contain alcohols, in which case those of higher carbon content such as butanol, iso-butanol, pentanol, etc. are preferred. One such preferred weak solvent system is a combination of from about 50 weight percent to about 70 weight percent butanol, from about 10 weight percent to about 20 weight percent toluene, and from about 20 weight percent to about 30 weight percent 1,1,1-trichloroethane, based on the total weight of the solvent.

A test was conducted to evaluate the adhesion of the sealant primer of the present invention and two prior art sealant primers to steel test panels which had been previously coated with enamel coatings. In this test, steel test panels were first coated with an automotive enamel finish of a type widely used in the industry. The enamel coating was allowed to cure thoroughly and a layer of sealant primer was applied to the paint surface. The sealant primer was allowed to dry for a time which varied between five and ninety minutes. At the end of this time the panel was scored with an "X" which intersected the sealant primer layer and exposed the bare metal of the test panel. A strip of Type 710 tape (3M Company, Minneapolis, MN) was applied over the scored "X" and pressed in place. The tape strip was then pulled from the test panel in a direction perpendicular to the panel surface. The percent paint remaining on the test panel after removal of the tape was estimated and recorded. The test was repeated for two prior art sealant primers of types widely in use in the industry at the time of filing this application. The results of these tests appear in Table 1.

TABLE 1

Adhesion of Sealant Primer to Enamel Coated Steel Panels

| Sealant Primer | Drying Time (Minutes) | Percent Paint Remaining on Substrate Panel After Tape Pull Test |
|---|---|---|
| Sealant Primer of This Invention | 5 | 100 |
|  | 20 | 100 |
|  | 30 | 100 |
|  | 40 | 100 |
|  | 60 | 100 |
|  | 90 | 100 |
| Prior Art Sealant Primer "A" | 5 | 0 |
|  | 20 | 0 |
|  | 30 | 43 |
|  | 40 | 100 |
|  | 60 | 100 |

TABLE 1-continued

Adhesion of Sealant Primer to Enamel Coated Steel Panels

| Sealant Primer | Drying Time (Minutes) | Percent Paint Remaining on Substrate Panel After Tape Pull Test |
| --- | --- | --- |
|  | 90 | 100 |
| Prior Art Sealant Primer "B" | 5 | 3 |
|  | 20 | 10 |
|  | 30 | 42 |
|  | 40 | 76 |
|  | 60 | 93 |
|  | 90 | 100 |

As can be seen from the data appearing in Table 1, excellent adhesion to the steel substrate of the sealant primer of this invention and the underlying layer(s) of enamel coating was achieved after only five minutes of drying time In contrast, with prior art sealant primers "A" and "B" comparable results were observed only after 40 and ninety minutes, respectively.

Next, the adhesion of a bead of motor vehicle window sealant polymer composition and an underlying layer of the sealant primer of this invention to enamel coated steel test panels was evaluated under various conditions In a first test, designed to evaluate the adhesiveness of sealant bead and primer layer after various drying times, the sealant primer of this invention was applied to test panels which had been previously coated with automotive enamel coating The primer was allowed to dry for a time which varied between five and three-hundred minutes The substrate test panel enamel coatings were white and "metallic"0 blue, representative of straight shade and metallic automotive enamel coating colors. After the appropriate drying time had elapsed in each case, a heavy bead of window sealant polymer composition of the type disclosed in U.S. Pat. No. 4,222,925 to Bryant, et al. (the contents of which are incorporated herein by reference) was applied over the primer layer. At the end of either one or three days, a short knife cut was made in the cured bead of window sealant polymer parallel to the surface of the substrate test panel and the bead of window sealant was pulled away from the test panel (so-called "one day knife adhesion" or "three-day knife adhesion" tests).

Successful adhesion of the window sealant bead and its underlying layers of sealant primer and enamel coating to the substrate test panel was demonstrated by cohesive failure ("CF") of the window sealant bead. That is to say, in the case of successful adhesion, the bead of sealant tore along a plane roughly parallel to the surface of the test panel, leaving some of the sealant bead and the underlying layers of sealant primer and enamel coating firmly bonded to the test panel. In this test, adhesive failure ("AF") occurred when the window sealant bead and the underlying layers of sealant primer and enamel coating pulled away from the test panel. The data from this test are presented in Table 2.

As can be seen from the data presented in Table 2, there was successful adhesion to the steel substrate panels of the window sealant bead and the underlying layers of sealant primer and enamel coating in every trial using the sealant primer of this invention, even for drying times as short as five minutes This behavior is particularly advantageous in such applications as motor vehicle fixedwindow sealing where slow drying times of the sealant primer might place unwanted limitations on a continuous assembly process.

TABLE 2

Adhesion of Window Sealant Bead and Underlying Sealant Primer Layer to Prepainted Substrates After Various Sealant Primer Drying Times

| Trial | Sealant Primer Substrate | | Knife Adhesion Test | |
| --- | --- | --- | --- | --- |
|  | Drying Time (Minutes) | Enamel Color | One Day | Three Day |
| 1 | 5 | White | CF | CF |
| 2 | 5 | Blue | CF | CF |
| 3 | 60 | White | CF | CF |
| 4 | 60 | Blue | CF | CF |
| 5 | 120 | White | CF | CF |
| 6 | 120 | Blue | CF | CF |
| 7 | 180 | White | CF | CF |
| 8 | 180 | Blue | CF | CF |
| 9 | 240 | White | CF | CF |
| 10 | 240 | Blue | CF | CF |
| 11 | 300 | White | CF | CF |
| 12 | 300 | Blue | CF | CF |

In a second test of the adhesion of a bead of window sealant and the underlying layers of sealant primer and enamel, the sealant primer of this invention was applied to steel test panels which had been prepainted with one of two colors of enamel and allowed to stand open to the air for a period which varied between four and twenty-one days. After the appropriate elapsed time in each case, a heavy bead of window sealant polymer composition was applied over the sealant primer layer and allowed to cure for three days. After this time, the bead of window sealant was notched with a knife and pulled away from the panel in the manner described above ("three-day knife adhesion" test). Cohesive failure or adhesive failure of the window sealant bead was noted for each trial, and the results are presented in Table 3.

The data appearing in Table 3 show that excellent adhesion of the window sealant bead and the underlying layers of sealant primer and enamel coating was achieved with the sealant primer of this invention even after the sealant primer had dried and remained open to the air for periods of up to twenty-one days.

TABLE 3

Adhesion of Window Sealant Bead and Underlying Sealant Primer Layer to Prepainted Substrates After Allowing the Sealant Primer to Stand Open to the Air for Various Times

| Trial | Sealant Primer "Open Time" (Days) | Substrate Color | Three Day Knife Adhesion Test |
| --- | --- | --- | --- |
| 1 | 4 | White | CF |
| 2 | 4 | Blue | CF |
| 3 | 7 | White | CF |
| 4 | 7 | Blue | CF |
| 5 | 14 | White | CF |
| 6 | 14 | Blue | CF |
| 7 | 21 | White | CF |
| 8 | 21 | Blue | CF |

This behavior is particularly advantageous in continuous motor vehicle assembly processes when, for various reasons, the assembly process must be shut down for a period of days. Using the sealant primer of this invention, the continuous assembly process may be started again at the point at which it was stopped. There is no need to reapply sealant primer (e.g. "re-prime") to those motor vehicles on the assembly line when the line was shut down.

EXAMPLE 1

Preparation of Sealant Primer Polymer Base Composition—"Single Step" Method

Toluene (254.6 g) and 1,1,1-trichloroethane (258.4 g) were added to a 5-liter flask fitted with a stirrer and condensor and heated to reflux. A solution was prepared by dissolving 40.8 g of 2-sulfoethyl methacrylate (i.e. 2-methyl-2-propenoic acid, 2-hydroxyethane-sulfonic acid ester), 399.1 g of methyl methacrylate, 415.0 g of butyl methacrylate, 163.7 g of isobutyl methacrylate and 9.0 g of 2,2'-azobis-(2-methylbutyronitrile) in a mixture of 160 g of 1,1,1-trichloroethane and 305.6 g of n-butanol. This solution was slowly added to the refluxing solvents over the period of two hours. When addition was complete, the mixture was held at reflux for one-half hour after which a solution of 1.2 g of 2,2'-azobis-(2-methylbutyronitrile) in 40 g of n-butanol) was slowly added to the mixture of monomers at reflux. When addition was complete, the mixture was held at reflux for a period of two hours, then cooled, and the polymer solution decanted and stored for later use. Analysis indicated the polymer composition to have a weighted average molecular weight of 34,331 Daltons.

EXAMPLE 2

Preparation of Sealant Primer Polymer Base Composition—"Single Step" Method (Alternative)

1,1,1-Trichloroethane (100 g), n-heptane (311.2 g), and n-butanol (63.7 g) were added to a 5-liter flask fitted with a stirrer and condensor and heated to reflux. A solution was prepared by dissolving 40.8 g of 2-sulfoethyl methacrylate (i.e. 2-methyl-2-propenoic acid 2-hydroxyethane-sulfonic acid ester), 399.1 g of methyl methacrylate, 415.0 g of butyl methacrylate, 163.7 g of isobutyl methacrylate and 9.0 g of 2,2,-azobis-(2-methylbutyronitrile) in a mixture of 100 g of n-butanol and 300 g of 1,1,1-trichloroethane. This solution was slowly added to the refluxing solvents over the period of two hours. When addition was complete, the mixture was held at reflux for one-half hour after which a solution of 1.2 g of 2,2,-azobis-(2-methylbutyronitrile) in 40 g of n-butanol) was slowly added to the mixture of monomers. When addition was complete, the mixture was held at reflux for a period of two hours, then cooled, and the polymer solution decanted and stored for later use. The polymer composition was found to have a weighted average molecular weight of 28,383 Daltons.

EXAMPLE 3

Preparation of Sealant Primer Base Polymer Composition—"Two-Step Process

A five-liter flask, fitted with a stirrer, addition funnel, condensor, and heating mantle, was charged with a solution of 2-sulfoethyl methacrylate (48.0 g), methyl methacrylate (261.6 g), butyl methacrylate (271.8 g), and iso-butyl methacrylate (107.4 g) dissolved in a mixture of 272 ml (219.0 g) of methyl ethyl ketone and 500 ml (392.4 g) of iso-propanol. This mixture was stirred and heated to reflux. The polymerization initiator, 2,2,-azobis(2methylbutyronitrile) (1.0 g), dissolved in a mixture of 25 ml (20.4 g) of methyl ethyl ketone and 18.3 ml (14.4 g) of iso-propanol was added slowly to the refluxing flask contents over the period of one-half hour.

When addition of the initiator was complete, the resulting mixture was held, with stirring, at a temperature of reflux for one-half hour. At the end of this time, a solution of methyl methacrylate (211.2 g), butyl methacrylate (219.6 g), iso-butyl methacrylate (86.4 g), and 2,2'-azobis(2-methylbutyronitrile) (3.4 g) in 509 ml (410.0 g) of methyl ethyl ketone were added to the flask contents slowly over a period of two hours at reflux. When addition was complete, the flask contents were held, with stirring, at reflux for one-half hour.

After this time, a solution of 2,2'-azobis(2-methylbutyronitrile) (1.0 g) in a mixture of 25.3 ml (20.4 g) of methyl ethyl ketone and 18.3 ml (14.4 g) of iso-propanol was added slowly to the flask contents over the period of one-half hour at reflux. When addition was complete, the mixture was stirred at heated at reflux for two hours. Methyl ethyl ketone (483 ml, 388.8 g) was added and the mixture was cooled to room temperature, decanted, and stored for later use. The polymer composition was found by analysis to have a weighted average molecular weight of 37,647 Daltons

EXAMPLE 4

Preparation of Sealant Primer Composition

Acrylic resin (2000 g), prepared as described above in Example 1 comprising 45.0% non-volatile content, was weighed into a 2 gal plastic container. Using an air-driven mixer and a two-inch Cowles blade, 42.3 g of Cabosil (fumed silica, Cabot Corp., Tuscola, IL) was dispersed in the resin by adding at a rate of 1.5 g/min. After addition of the silica was complete, 114.4 of a carbon black dispersion which contained 50% by volume of carbon black was added and mixing was continued for five minutes.

When the pre-mix was found to be smooth and free of any agglomerates, it was slowly fed into a water-cooled sand mill equipped with 1.4–2.4 mm zirconium oxide beads. The feed rate and the speed of the mill was adjusted so that one pass of the material through the mill required 30 minutes to complete. The material was passed through the mill twice, after which the fineness of grind was found to be less than 10 microns.

The material was then diluted to 40% non-volatile content with 140.6 g of n-butanol, mixing with an air-driven stirrer and two-inch Cowles blade

We claim:

1. In a process for bonding a non-porous material to an enamel-coated substrate comprising the steps of:
    1) applying a bead of polymeric sealant material to said enamel-coated substrate; and
    2) contacting said non-porous material to said bead of polymeric material;

the improvement comprising:
    3) prior to applying said bead of polymeric sealant material to said enamel-coated substrate, first applying to said enamel-coated substrate a sealant primer composition comprising:
        a) from about 35 weight percent to about 55 weight percent of a sealant primer polymer base composition comprising the reaction product of
            1) from about 2 weight percent to about 10 weight percent of 2-sulfoethyl methacrylate;
            2) from about 35 weight percent to about 45 weight percent of methyl methacrylate;
            3) from about 35 weight percent to about 45 weight percent butyl methacrylate; and
            4) from about 10 weight percent to about 20 weight percent iso-butyl methacrylate;

b) from about 1 weight percent to about 10 weight percent of a pigment dispersion;

c) the balance comprising a solvent effective to interpenetrate the the substrate enamel coating selected from the group consisting of
 i) chlorinated saturated hydrocarbons of from two to three carbon atoms;
 ii) saturated alkanols of from one to six carbon atoms;
 iii) saturated dialkyl ketones of from three to six carbon atoms;
 iv) alkyklated benzene hydrocarbons of from seven to ten carbon atoms, and mixtures thereof.

2. A process as defined by claim 1 wherein said solvent is selected from acetone, methyl ethyl ketone, toluene, xylene, 1,1,1-trichloroethane, methanol, ethanol, propanol, iso-propanol, n-butanol, and mixtures thereof.

3. A sealant primer composition for bonding non-porous materials to enamel coated substrates comprising
 a) from about 35 weight percent to about 55 weight percent of a sealant primer polymer base composition comprising the reaction product
  1) from about 2 weight percent to about 10 weight percent of 2-sulfoethyl methacrylate;
  2) from about 35 weight percent to about 45 weight percent methyl methacrylate;
  3) from about 35 weight percent to about 45 weight percent butyl methacrylate; and
  4) from about I0 weight percent to about 20 weight percent iso-butyl methacrylate;
 b) from about 1 weight percent to about 10 weight percent of a pigment dispersion;
 c) the balance comprising a solvent effective to interpenetrate the substrate enamel coating selected from the group consisting of
  1) chlorinated saturated hydrocarbons of from two to three carbon atoms,
  2) saturated alkanols of from one to six carbon atoms,
  3) saturated dialkyl ketones of from three to six carbon atoms,
  4) alkylated benzene hydrocarbons of from seven to ten carbon atoms, and mixtures thereof.

4. A sealant primer composition as defined in claim 3 wherein said pigment dispersion comprises carbon black.

5. A sealant primer composition as defined in claim 4 wherein said carbon black is of a particle size less than about 15 microns.

6. A sealant primer composition as defined in claim 3 wherein said solvent is selected from acetone, methyl ethyl ketone, toluene, xylene, 1,1,1-trichloroethane, methanol, ethanol, propanol, iso-propanol, n-butanol, and mixtures thereof.

7. A sealant primer composition as defined in claim 6 wherein said solvent comprises from about 75 to about 90 weight percent methyl ethyl ketone and from about 10 to about 25 weight percent iso-propanol, said percentages based on the total weight of solvent present in said composition.

8. A sealant primer composition as defined in claim 7 wherein said solvent comprises from about 50 to about 70 weight percent n-butanol, from about 10 to about 20 weight percent toluene, and from about 20 to about 30 weight percent 1,1,1-trichloroethane, said percentages based on the total weight of solvent present in said composition.

9. A sealant primer composition as defined in claim 1 wherein said sealant primer polymer base composition has a number average molecular weight in the range of between about 20,000 and 100,000 Daltons.

* * * * *